(12) United States Patent
Nau et al.

(10) Patent No.: US 10,781,744 B2
(45) Date of Patent: Sep. 22, 2020

(54) DEVICE AND METHOD FOR REGULATING A COMPRESSOR FOR AN INTERNAL COMBUSTION ENGINE

(71) Applicant: Robert Bosch GmbH, Stuttgart (DE)

(72) Inventors: Michael Nau, Dornhan/Aischfeld (DE); Michael Baeuerle, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 12 days.

(21) Appl. No.: 16/260,799

(22) Filed: Jan. 29, 2019

(65) Prior Publication Data
US 2019/0234295 A1 Aug. 1, 2019

(30) Foreign Application Priority Data

Jan. 30, 2018 (DE) .......... 10 2018 201 376

(51) Int. Cl.
| | |
|---|---|
| *F02B 37/12* | (2006.01) |
| *F02B 39/10* | (2006.01) |
| *F02B 37/18* | (2006.01) |
| *F02B 33/32* | (2006.01) |
| *F02D 23/00* | (2006.01) |

(Continued)

(52) U.S. Cl.
CPC .............. *F02B 37/12* (2013.01); *F02B 33/32* (2013.01); *F02B 37/18* (2013.01); *F02B 39/10* (2013.01); *F02D 23/00* (2013.01); *F02D 41/0007* (2013.01); *F02D 41/18* (2013.01); *F02B 2037/125* (2013.01); *F02D 2200/025* (2013.01); *F02D 2200/0406* (2013.01)

(58) Field of Classification Search
CPC .. F02B 37/12; F02B 37/162; F02B 2037/122; F02B 2037/125; F02B 39/10; F02B 37/16–186; F02D 41/0007; F02D 41/18–187; F02D 2200/025; F02D 2200/0406

See application file for complete search history.

(56) References Cited

U.S. PATENT DOCUMENTS

| | | | |
|---|---|---|---|
| 8,312,718 B2 * | 11/2012 | Sun .......... | F02B 37/18 415/119 |
| 2001/0022084 A1 * | 9/2001 | Koelle ..... | F02B 37/18 60/602 |

(Continued)

FOREIGN PATENT DOCUMENTS

| | | | | |
|---|---|---|---|---|
| DE | 10 241 892 A1 | 3/2004 | | |
| GB | 2359380 A | * | 8/2001 | .............. F02B 37/18 |

*Primary Examiner* — Laert Dounis
(74) *Attorney, Agent, or Firm* — Norton Rose Fulbright US LLP; Gerard Messina

(57) ABSTRACT

A device and method for regulating a compressor for an internal combustion engine. At least one actual variable is detected that characterizes a property of an air column, which is situated at an outlet of the compressor in an induction tract of an internal combustion engine, the actual variable being compared in a comparison with a comparison value, the comparison value characterizing a limit for the property of the air column, a setpoint variable being determined as a function of the result of the comparison in order to shift the actual variable in the direction or opposite direction of the comparison value, and an actuator for influencing the actual variable being operated as a function of the setpoint variable.

13 Claims, 2 Drawing Sheets

(51) Int. Cl.
    *F02D 41/00*     (2006.01)
    *F02D 41/18*     (2006.01)

(56) References Cited

U.S. PATENT DOCUMENTS

| | | | |
|---|---|---|---|
| 2015/0096296 A1* | 4/2015 | Banker | F02D 41/0007 60/611 |
| 2017/0067393 A1* | 3/2017 | Xiao | F02B 39/10 |
| 2017/0074180 A1* | 3/2017 | Hellstrom | F02M 35/10157 |

\* cited by examiner

DEVICE AND METHOD FOR REGULATING A COMPRESSOR FOR AN INTERNAL COMBUSTION ENGINE

CROSS REFERENCE

The present application claims the benefit under 35 U.S.C. § 119 of German Patent Application No. DE 102018201376.4 filed on Jan. 30, 2018, which is expressly incorporated herein by reference in its entirety.

BACKGROUND INFORMATION

German Patent Application No. DE 10 241 892 A1 describes a method for operating an internal combustion engine comprising a compressor, in particular a turbocharger, in an exhaust tract of the internal combustion engine, in which updating a pump limit of the compressor is made possible. For this purpose a pressure ratio across the compressor is limited as a function of a mass flow through the compressor by way of the pump limit in order to prevent the compressor from pumping when charging the internal combustion engine with fresh air.

The pump limit designates an operating limit of the compressor, at which a charging process by the compressor reaches a limit state, i.e., at which a so-called pumping occurs. Pumping designates an operating state of the compressor, at which an air column, which exists in the induction tract of the internal combustion engine at the outlet of the compressor, oscillates. In the long term, this results in the destruction of the compressor.

SUMMARY

An object of the present invention is to operate the compressor in a range that is optimized for supercharging, while avoiding a compressor pumping, i.e., an oscillation of the air column in the induction tract.

This object may be achieved an example method and an example device according to the present invention.

Regarding the method for regulating a compressor for an internal combustion engine, the present invention provides for detecting at least one actual variable that characterizes a property of an air column, which exists at an outlet of the compressor in an induction tract of an internal combustion engine, the actual variable being compared in a comparison with a comparison value, the comparison value characterizing a limit for an oscillation of the actual variable, a setpoint variable being determined as a function of the result of the comparison in order to shift the actual variable in the direction or opposite direction of the comparison value, and an actuator for influencing the actual variable being operated as a function of the setpoint variable. A regulating strategy is thereby implemented in which an operating point of the compressor is regulated to an optimized operating point without critical pumping.

Advantageously, the present invention provides for the actual variable to characterize a supercharging pressure, an air mass flow, a rotational speed of the compressor, a structure-borne noise in or on the compressor or in or on the induction tract, a current consumption or current fluctuations of an electric machine coupled to the compressor. These variables may be evaluated particularly well in order to detect conspicuous characteristics regarding the oscillations.

Advantageously, the present invention provides for the actual variable to characterize the supercharging pressure and for the comparison value to characterize a limit value for an oscillation of the supercharging pressure, in particular in a range from 5 to 50 Hz, or for the actual variable to characterize the air mass flow, the comparison value characterizing a limit value for an oscillation of the air mass flow, in particular in a range from 5 to 50 Hz. These are particularly good state variables for detecting conspicuous characteristics regarding oscillations.

Advantageously, the present invention provides for the actual variable to characterize the structure-borne noise in or on the compressor or in or on the induction tract and for the comparison value to characterize a limit value for the structure-borne noise, in particular a sound level. This makes it possible to use an increase in noise accompanying a rise in the amplitude of the actual variable as an indication of a conspicuous characteristic regarding oscillations.

Advantageously, the present invention provides for the structure-borne noise to be detected using a microphone or using a pressure sensor. This makes it possible to detect the increase in noise in a particularly simple manner.

Advantageously, the present invention provides for the actual variable to characterize the rotational speed of the compressor and for the comparison value to characterize a limit value for the rotational speed, in particular, an oscillation in a range from 5 to 50 Hz. By monitoring the rotational speed, characteristic oscillations may be detected particularly well.

Advantageously, the present invention provides for the actual variable to characterize the current consumption or current fluctuations of an electric machine of an electrically assisted exhaust-gas turbocharger in particular in a range from 5 to 50 Hz and for the comparison value to characterize a limit value for the current consumption or current fluctuations in particular in a range from 5 to 50 Hz. By monitoring the rotational speed, characteristic oscillations may be detected particularly well. By monitoring this current consumption, which is performed in any event for other purposes, e.g., for the electronic commutation of the electric machine, characteristic oscillations may also be detected particularly well.

Advantageously, the present invention provides for a first setpoint variable to be determined as a function of a characteristics map, which assigns setpoint variables to a pressure ratio between an inlet of the compressor and an outlet of the compressor, an intake-air temperature and a pressure at the inlet of the compressor, the actual variable being determined, which sets in for the first setpoint variable, a second setpoint variable being determined as a function of the result of the comparison, until the actual variable reaches the comparison value or a specified range around the comparison value. The compressor is thus moved from an operating point specified by the characteristics map to an operating point at the oscillation limit. This makes it possible to reach a real optimized operating point by starting from a theoretical optimized operating point.

Advantageously, the present invention provides that, with respect to a second setpoint variable, when the actual variable reaches the comparison value or a specified range around the comparison value at least temporarily, this second setpoint variable is stored in the characteristics map together with a then obtaining (prevailing) pressure ratio between the inlet of the compressor and the outlet of the compressor, a then obtaining (prevailing) intake-air temperature and a then obtaining (prevailing) pressure at the inlet of the compressor. This makes it possible to store an attained real optimized operating point as the new theoretical optimized operating point. The characteristics map is thereby adapted.

Advantageously, the present invention provides for the actuator to be a bypass valve, which is operated as a function of the setpoint variable, a setpoint valve cross section of the bypass valve being increased as a function of the setpoint variable if the actual variable exceeds the comparison value by a first specified value, and the setpoint valve cross section of the bypass valve being decreased as a function of the setpoint variable if the actual variable falls below the comparison value by a second specified value. This makes it possible to set a real optimized operating point for the compressor using a controllable bypass valve, in particular also when no controllable compressor is provided.

Advantageously, the present invention provides for the actuator to be an electric machine of the compressor, which is operated as a function of the setpoint variable, a setpoint rotational speed of the compressor being reduced as a function of the setpoint variable if the actual variable exceeds the comparison value by a first specified value, and the setpoint rotational speed of the compressor being increased as a function of the setpoint variable if the actual variable falls below the comparison value by a second specified value. This makes it possible to set a real optimized operating point for compressors having a controllable electric machine.

Advantageously, the present invention provides for a torque, by which the compressor is driven, to be throttled electromotively or braked in generator mode during a discharge cycle of the internal combustion engine or if a reduction of a setpoint torque of the internal combustion engine or a load drop or a reduction of a driver input exceed a threshold value. This reduces or avoids discharge surges that result in torque fluctuations in a turbine of the compressor when operating at the oscillation limit. During pauses of the discharge surges, the compressor is operated at a comparatively higher torque so that a constant rotational speed results in a target state.

Regarding the device for regulating a compressor for an internal combustion engine, the present invention provides for the device to comprise a processor, a memory, an input for information about an actual variable and an output for controlling an actuator of the internal combustion engine using a setpoint variable, instructions being stored in the memory, the execution of which on the part of the processor makes it possible to implement an example method as described herein.

BRIEF DESCRIPTION OF THE DRAWINGS

Further advantageous developments emerge from the following description and the figures.

DETAILED DESCRIPTION OF EXAMPLE EMBODIMENTS

Figure 1:
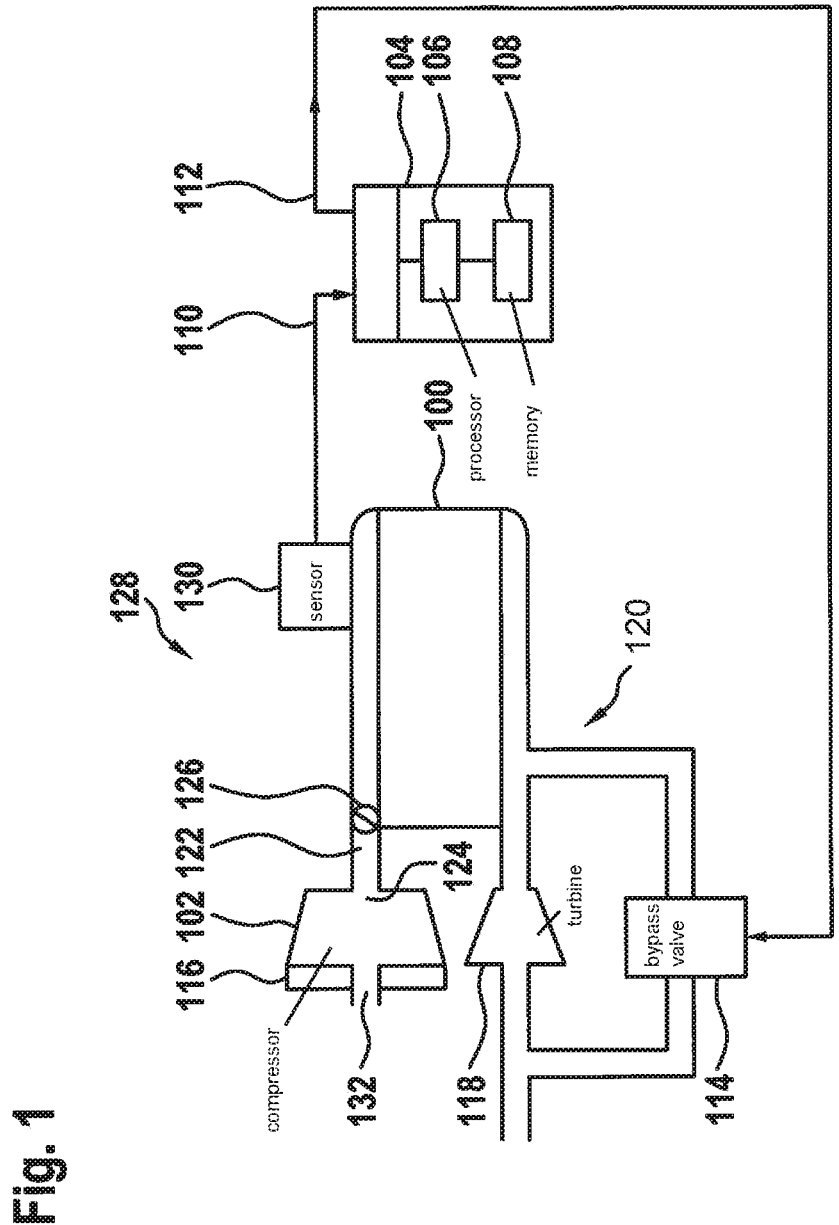
FIG. 1 shows parts of an internal combustion engine including a compressor in a schematic representation.

FIG. 1 schematically shows parts of an internal combustion engine 100 including a compressor 102. FIG. 1 also shows schematically a device 104 for regulating the compressor 102.

Device 104 comprises a processor 106, a memory 108, an input 110 for information about an actual variable and an output 112 for controlling an actuator of the internal combustion engine using a setpoint variable.

In the example embodiment, the actuator is a bypass valve 114. Alternatively or additionally, the actuator may also be an electric machine 116 for driving the compressor 102.

In the example embodiment, compressor 102 is an exhaust-gas turbocharger having a turbine 118, which is situated in an exhaust tract 120 of internal combustion engine 100 and which is designed to drive compressor 102.

Bypass valve 114 is situated in exhaust tract 120 parallel to turbine 118. Bypass valve 114 has a valve cross section that is adjustable by the setpoint variable via output 112.

The actual variable characterizes a property of an air column 122 that exists on an outlet 124, in the example between outlet 124 of the compressor and a throttle valve 126 in an induction tract 128 of internal combustion engine 100.

Preferably, the actual variable characterizes a supercharging pressure, an air mass flow, a rotational speed of compressor 102, a structure-borne noise in or on compressor 102 or in or on induction tract 128.

In the example, the actual variable is detected by a sensor 130 and is transmitted to device 104, i.e., to input 110. Sensor 130 is for example a supercharging pressure sensor that detects the supercharging pressure of the internal combustion engine. Alternatively, a rotational speed sensor may be provided that detects the rotational speed of the compressor. Alternatively, the actual variable may also be determined using a microphone or using a pressure sensor that detects acoustic vibrations in the induction tract.

Additional sensors and actuators are provided for regulating internal combustion engine 100, which are not shown graphically for reasons of clarity. These additional sensors provide information to device 104 about actual states of other operating variables of internal combustion engine 100 and information about a driver input. Signals are determined from this information, and the actuators required for operating internal combustion engine 100 are controlled as a function of these signals.

In the example embodiment, at least information about a pressure ratio between an inlet 132 of compressor 102 and the outlet 124 of compressor 102 is determined. Additionally, information about an intake-air temperature, in particular on inlet 132 of compressor 102, and information about a pressure on inlet 132 of the compressor is detected.

Memory 108 stores instructions, the execution of which on the part of processor 106 makes it possible to implement a method described in the following.

Figure 2:
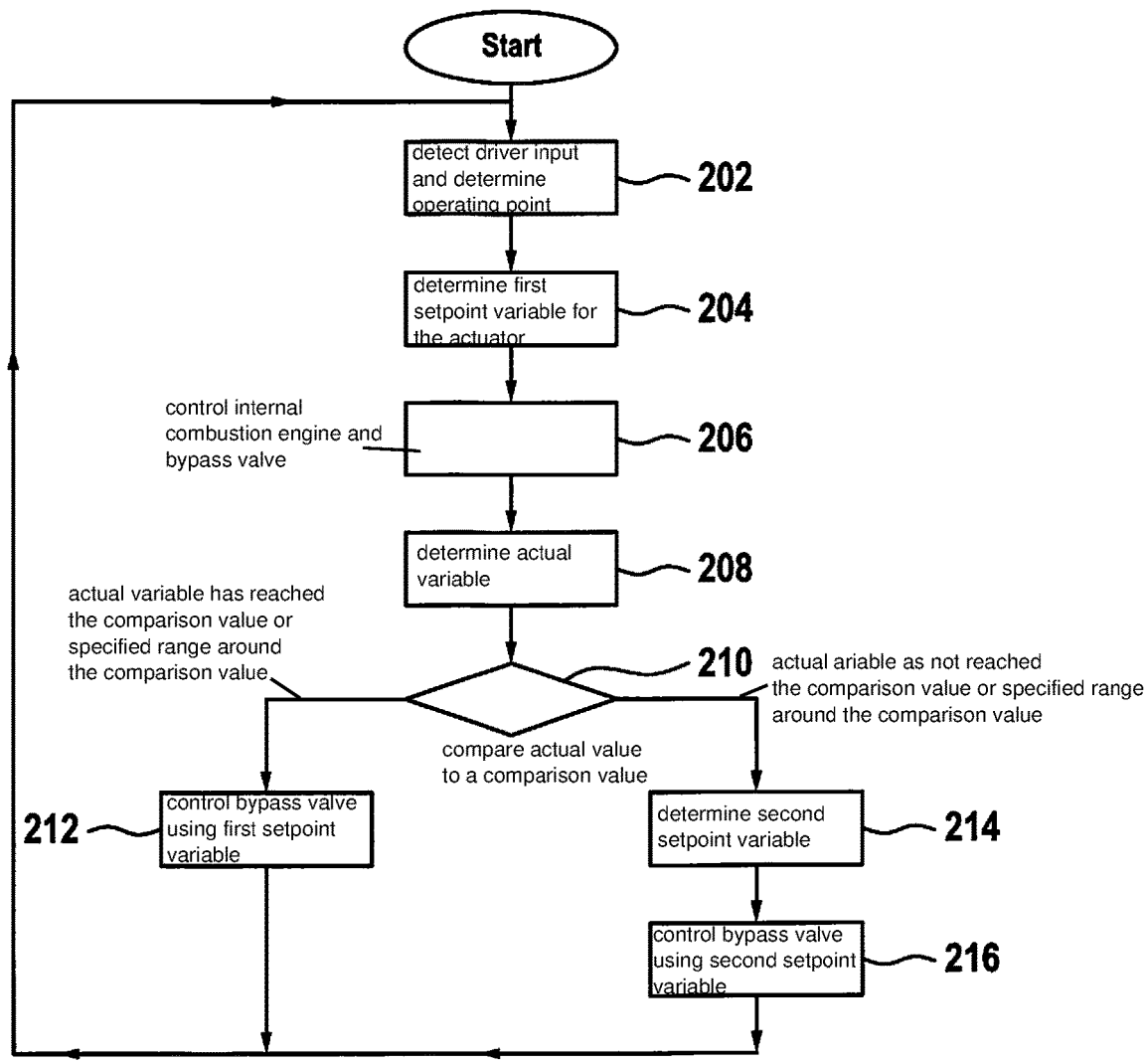
FIG. 2 shows steps in a method for regulating the compressor.

FIG. 2 shows steps in the method for regulating compressor 102. The method is implemented while internal combustion engine 100 is in operation. In the example, when the driver requests a respective operating point of internal combustion engine 100, initially existing setpoint variables matching the operating point are retrieved from a characteristics map, and the operating point is set accordingly. In a somewhat longer period of remaining at this operating point, if no conspicuous characteristics can be noted, the operating point is then shifted in the direction of the oscillation limit in that bypass valve 114 is closed further until conspicuous characteristics set in.

If conspicuous characteristic appear spontaneously, the bypass valve is opened further, for example, until the conspicuous characteristics abate sufficiently. As soon as a stable point has been attained, this point is stored optionally as a function of its operating situation in one or more characteristics maps. As a conspicuous characteristic, a check is performed in particular to determine whether an oscillation occurs at an actual variable that indicates an oscillation of the air column.

In a step 202, following the start, a driver input, for example a position of an accelerator pedal, is detected and the operating point for internal combustion engine 100 is determined as a function of this driver input.

Subsequently, in a step 204, a first setpoint variable is determined for the actuator, in the example bypass valve 114, as a function of a characteristics map, which assigns setpoint variables to a pressure ratio between inlet 132 of compressor 102 and outlet 124 of compressor 102, to the intake-air temperature and to the pressure at inlet 132 of compressor 102.

Subsequently, in a step 206, internal combustion engine 100 and bypass valve 114 are controlled to set the operating point. Bypass valve 114 is controlled using the first setpoint variable. Other control variables for internal combustion engine 100 are determined for example from characteristics maps.

Subsequently, in a step 208, the actual variable is determined that sets in for the first setpoint variable. The actual variable may characterize the supercharging pressure, the air mass flow, the rotational speed of the compressor, the structure-borne noise in or on the compressor or in or on the induction tract. The actual variable characterizes the supercharging pressure in the example. This supercharging pressure is detected by sensor 130.

Subsequently, in a step 210, in a comparison, the actual variable is compared to a comparison value. The comparison value characterizes a limit for an oscillation of the actual variable. A check is performed in the comparison as to whether the actual variable reaches the comparison value or a specified range around the comparison value. The comparison value characterizes in the example a setpoint value for an oscillation of the supercharging pressure, in particular at 5 to 50 Hz.

If oscillations of 5 to 50 Hz occur, then the compressor is operated at the oscillation limit. If the actual variable characterizes the air mass flow, the comparison value characterizes a setpoint value for an oscillation of the air mass flow, in particular at 5 to 50 Hz.

If the actual variable characterizes the structure-borne noise in or on compressor 102 or in or on induction tract 128, the comparison value characterizes a setpoint value for the structure-borne noise, in particular a sound level, i.e., an amplitude of the oscillation. In this example, the sound level reaches the setpoint value when the noise generation by oscillation becomes too great. For this purpose, the structure-borne noise is detected by a microphone or by the pressure sensor. When approaching the oscillation limit from the stable oscillation-free operation, initially the noise increases significantly. Conspicuous characteristics in the supercharging pressure, in the air mass flow and in the rotational speed are here initially absent. An increase in noise thus allows for an early regulation. In a further approach toward the oscillation limit, conspicuous characteristics occur in the supercharging pressure and in the air mass flow and in the rotational speed.

If the actual variable characterizes the rotational speed of the compressor, then the comparison value characterizes a setpoint value for the rotational speed, in particular an oscillation in a range from 5 to 50 Hz or less. This makes oscillations in induction tract 128 in the low 5 to 50 Hz range detectable.

An enduring operation with pronounced oscillations must necessarily be avoided since this results in damage to the exhaust-gas turbocharger, e.g., axial bearing, compressor wheel. An operation at a slightly increased noise level near the pump limit may be accepted on the other hand. This is the case when the actual variable has reached the comparison value or the specified range around the comparison value.

If the actual variable has reached the comparison value or the specified range around the comparison value, a step 212 is performed. Otherwise a step 214 is performed.

In step 212, bypass valve 114 is controlled using the first setpoint variable. Subsequently, step 202 is performed.

In step 214, a second setpoint variable is determined. In the example, bypass valve 114 is controlled as a function of the setpoint variable. For this purpose, a setpoint valve cross section of bypass valve 114 is increased as a function of the setpoint variable if the actual variable exceeds the comparison value by a first specified value. The setpoint valve cross section of bypass valve 114 is decreased as a function of the setpoint variable if the actual variable falls below the comparison value by a second specified value.

As a function of the result of the comparison, the second setpoint variable is determined in order to shift the actual variable in the direction of the comparison value.

Subsequently, a step 216 is performed.

In step 216, bypass valve 114 is controlled using the second setpoint variable.

Subsequently, step 202 is performed. In step 204, the second setpoint variable replaces the first setpoint variable if the same operating point is determined in step 202. Otherwise, the first setpoint variable is determined anew for a new operating point.

Bypass valve 114 is thus operated as an actuator for influencing the actual variable as a function of the setpoint variable. Instead of bypass valve 114, it is also possible to provide for influencing the rotational speed of compressor 102. The actuator is in this case the electric machine 116 of compressor 102, which is operated as a function of the setpoint variable. A setpoint rotational speed of compressor 102 is decreased as a function of the setpoint variable if the actual variable exceeds the comparison value by a specified value. The setpoint rotational speed of compressor 102 is increased as a function of the setpoint variable if the actual variable falls below the comparison value by a specified value.

Optionally, there may be a provision to check whether the actual variable in the case of a second setpoint variable reaches the comparison value or a specified range around the comparison value at least temporarily. If this is the case, there may be a provision to store this second setpoint variable with a then obtaining (prevailing) pressure ratio between the inlet of the compressor and the outlet of the compressor, a then obtaining (prevailing) intake-air temperature and a then obtaining (prevailing) pressure at the inlet of the compressor in the characteristics map.

Optionally, the present invention may provide for a torque, by which compressor 102 is driven, to be throttled electromotively or braked in generator mode during a discharge cycle of internal combustion engine 100 or if a reduction of a setpoint torque of internal combustion engine 100 exceed a threshold value. If no bypass system exists, i.e., if bypass valve 114 is omitted, or in the case of a bypass valve 114 that is not controllable, an analog regulation may be performed using electric machine 116 of exhaust-gas turbocharger. That is, instead of opening bypass valve 114, the torque of electric machine 116 is reduced and instead of closing bypass valve 114 the torque of electric machine 116 is reduced.

In exceptional cases, in which the oscillation limit in a compressor characteristics map becomes partially more favorable with rising rotational speed of the exhaust-gas turbocharger, it is possible to follow an inverted strategy.

Furthermore, additional actuators may also be included in control concepts, e.g.: a variable swirl device, a variable diffuser, or a variable trim of compressor 102.

When the oscillation limit is reached, these actuators are adjusted in such a way that an oscillation is barely avoided, i.e., that the efficiency factor is optimized.

At the same time, if required by the operating point requested by the driver, it is possible to increase the current supplied to electric motor 116 and/or to minimize a bypass mass flow.

In situations of a pending supercharging pressure, if there is a spontaneous load drop, e.g., in the form of a sudden reduction of the driver input, it is possible to use electric machine 116 actively in generator mode for braking in order to avoid or at least reduce an oscillation as a result of a closing throttle valve 126.

In situations of a pending supercharging pressure, if there is a spontaneous load drop, e.g., in the form of a sudden reduction of the driver input, it is possible to use electric machine 116 actively in generator mode for braking in order to avoid or at least reduce an oscillation as a result of a closing throttle valve 126.

This is achieved by regenerative braking at maximum power and a closed bypass valve so that the target rotational speed of the compressor is reached as quickly as possible and with the highest possible recuperative efficiency.

If in the process a sensed variable should exceed a limit value, the bypass valve, at least in the subsequent dynamics case, is opened slightly until the limit value of the sensed variable is reached. Alternative controls proceed also dynamically, analogous to the procedure described above, in the static or quasi-static case.

The limit values for the comparison with the sensed variable may differ in dynamic and in static operation.

What is claimed is:

1. A method for regulating a compressor for an internal combustion engine, comprising:
    detecting at least one actual variable which describes a property of an air column situated on an outlet of the compressor in an induction tract of the internal combustion engine;
    comparing the actual variable with a comparison value, the comparison value describing a limit for an oscillation of the actual variable;
    determining a setpoint variable as a function of a result of the comparison to shift the actual variable in the direction or opposite direction of the comparison value;
    operating an actuator for influencing the actual variable as a function of the setpoint variable;
    wherein the actuator is a bypass valve, which is operated as a function of the setpoint variable, a setpoint valve cross section of the bypass valve being increased as a function of the setpoint variable when the actual variable exceeds the comparison value by a first specified value, and the setpoint valve cross section of the bypass valve being decreased as a function of the setpoint variable when the actual variable falls below the comparison value by a second specified value.

2. The method as recited in claim 1, wherein the actual variable describes a supercharging pressure, or an air mass flow, or a rotational speed of the compressor, or a structure-borne noise in or on the compressor, or a structure-borne noise in or on the induction tract, or a current consumption of an electric machine coupled to the compressor, or current fluctuations of the electric machine coupled to the compressor.

3. The method as recited in claim 2, wherein (i) the actual variable describes the supercharging pressure, and the comparison value is a setpoint value for an oscillation of the supercharging pressure in a range from 5 to 50 Hz, or (ii) the actual variable describes the air mass flow, and the comparison value is a setpoint value for an oscillation of the air mass flow in a range from 5 to 50 Hz.

4. The method as recited in claim 2, wherein the actual variable describes the structure-borne noise in or on the compressor or the structure-borne noise in or on the induction tract, and the comparison value is a setpoint value for a sound level of the structure-borne noise.

5. The method as recited in claim 4, wherein the structure-borne noise is detected using a microphone or using a pressure sensor.

6. The method as recited in claim 2, wherein the actual variable describes the rotational speed of the compressor, and the comparison value is a setpoint value for an oscillation in a range from 5 to 50 Hz or less.

7. The method as recited in claim 2, wherein the actual variable describes the current consumption of the electric machine coupled to the compressor or the current fluctuations in a range from 5 to 50 Hz of the electric machine coupled to the compressor, wherein the electric machine is an electric machine of an electrically assisted exhaust-gas turbocharger and the comparison value is a limit value for the current consumption or current fluctuations in a range from 5 to 50 Hz.

8. The method as recited in claim 1, wherein a first setpoint variable is determined as a function of a characteristics map, which assigns setpoint variables to a pressure ratio between an inlet of the compressor and an outlet and a throughput variable of the compressor, the actual variable being determined, which sets in for the first setpoint variable, a second setpoint variable being determined as a function of the result of the comparison, until the actual variable reaches the comparison value or a specified range around the comparison value.

9. The method as recited in claim 8, wherein when the actual variable with respect to the second setpoint variable reaches the comparison value or a specified range around the comparison value at least temporarily, the second setpoint variable being stored in the characteristics map together with the pressure ratio between the inlet of the compressor and the outlet of the compressor, a prevailing intake-air temperature and a prevailing pressure at the inlet of the compressor.

10. A method for regulating a compressor for an internal combustion engine, the method comprising:
    detecting at least one actual variable which describes a property of an air column situated on an outlet of the compressor in an induction tract of the internal combustion engine;
    comparing the actual variable with a comparison value, the comparison value describing a limit for an oscillation of the actual variable;
    determining a setpoint variable as a function of a result of the comparison to shift the actual variable in the direction or opposite direction of the comparison value;
    operating an actuator for influencing the actual variable as a function of the setpoint variable;
    wherein the actuator is an electric machine of the compressor, which is operated as a function of the setpoint variable, a setpoint rotational speed of the compressor being reduced as a function of the setpoint variable when the actual variable exceeds the comparison value by a first specified value, and the setpoint rotational speed of the compressor being increased as a function of the setpoint variable when the actual variable falls below the comparison value by a second specified value.

11. A method for regulating a compressor for an internal combustion engine, the method comprising:
   detecting at least one actual variable which describes a property of an air column situated on an outlet of the compressor in an induction tract of the internal combustion engine;
   comparing the actual variable with a comparison value, the comparison value describing a limit for an oscillation of the actual variable;
   determining a setpoint variable as a function of a result of the comparison to shift the actual variable in the direction or opposite direction of the comparison value;
   operating an actuator for influencing the actual variable as a function of the setpoint variable;
   wherein a torque, by which the compressor is driven, is throttled electromotively or braked in generator mode during a discharge cycle of the internal combustion engine, or when a reduction of a setpoint torque of the internal combustion engine or a load drop or a reduction of a driver input exceeds a threshold value.

12. A device for regulating a compressor for an internal combustion engine, the device comprising:
   a processor;
   a memory;
   an input for information about at least one actual variable; and
   an output for controlling an actuator of the internal combustion engine using a setpoint variable, instructions being stored in the memory, the execution of which on the part of the processor causes the processor to perform:
      detecting the at least one actual variable which describes a property of an air column situated on an outlet of the compressor in an induction tract of the internal combustion engine;
      comparing the actual variable with a comparison value, the comparison value describing a limit for an oscillation of the actual variable;
      determining the setpoint variable as a function of a result of the comparison to shift the actual variable in the direction or opposite direction of the comparison value;
      operating the actuator for influencing the actual variable as a function of the setpoint variable;
      wherein the actuator is a bypass valve, which is operated as a function of the setpoint variable, a setpoint valve cross section of the bypass valve being increased as a function of the setpoint variable when the actual variable exceeds the comparison value by a first specified value, and the setpoint valve cross section of the bypass valve being decreased as a function of the setpoint variable when the actual variable falls below the comparison value by a second specified value.

13. A device for regulating a compressor for an internal combustion engine, the device comprising:
   a processor;
   a memory;
   an input for information about at least one actual variable; and
   an output for controlling an actuator of the internal combustion engine using a setpoint variable, instructions being stored in the memory, the execution of which on the part of the processor causes the processor to perform:
      detecting the at least one actual variable which describes a property of an air column situated on an outlet of the compressor in an induction tract of the internal combustion engine;
      comparing the actual variable with a comparison value, the comparison value describing a limit for an oscillation of the actual variable;
      determining the setpoint variable as a function of a result of the comparison to shift the actual variable in the direction or opposite direction of the comparison value;
      operating the actuator for influencing the actual variable as a function of the setpoint variable;
      wherein the actuator is an electric machine of the compressor, which is operated as a function of the setpoint variable, a setpoint rotational speed of the compressor being reduced as a function of the setpoint variable when the actual variable exceeds the comparison value by a first specified value, and the setpoint rotational speed of the compressor being increased as a function of the setpoint variable when the actual variable falls below the comparison value by a second specified value.

* * * * *